2,765,988

REDUCTION OF IRON ORES

Olav Möklebust, Hauge i Dalane, Norway, assignor to National Lead Company, New York, N. Y., a corporation of New Jersey No Drawing. Application September 20, 1951,
Serial No. 247,569

Claims priority, application Norway June 6, 1951

5 Claims. (Cl. 241—14)

This invention relates to the art of producing iron concentrates from oxidic iron ores and more particularly to the production of a concentrate substantially pure as regards the iron or iron oxide content and containing a very high proportion of its total iron content in the form of metallic iron.

Thermal reduction of iron ores at comparatively low temperatures as prescribed in U. S. Patent No. 2,523,138 will provide a partially reduced product which can readily be separated by crushing and magnetic separation into an iron concentrate and a gangue portion. The concentrate obtained by such a method will, however, contain a percentage of siliceous gangue which, to some degree, limits its field of usefulness. While such an iron concentrate may be successfully smelted in a blast furnace, the silica content will be found too high for conversion directly to steel, for instance in an open hearth furnace.

The principal object of this invention, therefore, is to provide a process for production of substantially pure iron concentrate from oxidic iron ores. A further object of this invention is to provide a process for production from oxidic iron ores of a substantially pure iron concentrate in which the iron content is largely in metallic state. Another object is to produce from partially reduced iron ore, a high grade, substantially pure, iron concentrate suitable for conversion to steel in an open hearth furnace and a lower grade iron concentrate suitable for smelting in a blast furnace. These and other objects of this invention will be apparent from the following complete description thereof.

This invention in its broadest aspects contemplates treatment of an oxidic iron ore by first comminuting the ore and admixing with coil or other carbonaceous reducing agent and reducing the iron content thereof at a relatively low temperature for instance between 600–1200° C. The reduced product will contain between 60–90% of its iron content in metallic form. After reduction, the product according to the process of this invention is crushed in a ball or rod mill under conditions to convert the iron content to flake form. It has been found that ball or rod milling can be effectively utilized to produce a flaking of the iron content of the reduced material. After ball or rod milling, the crushed material is classified in a wet classifier so that the flake metallic iron particles are separated as the heavy fraction from the lighter fraction containing gangue and finer iron and iron oxide. After classification, the iron flake fraction is further treated by magnetic separation of low magnetic intensity to produce a product containing a total iron content of not less than 90% Fe and containing at least 80% of metallic iron.

The crushing stage in which the iron content of the reduced ore is hammered or formed into flakes is carried out with a rod or ball mill containing a normal charge of rods or balls. Such mills are generally similar in their action and may be referred to as of the ball mill type. Apparently, the combination of impact and rolling action crushes the more friable gangue particles and at the same time rolls the metallic iron into flakes of substantial size. The milling step should be controlled so that milling is not continued past the point where the iron flakes are formed since additional time in the mill will result in breaking down the iron flake structure with ultimate lowering of the recovery of pure iron.

The classification step is conveniently carried out in a cone type classifier for instance a Deister classifier and the relative flow of water and input material being adjusted so that the iron flakes are recovered as the heavier fraction while the unflaked gangue and lighter and finer oxide and metallic constituents are separated as the lighter fraction. It will be found that notwithstanding the flake form of the iron particles they can readily be separated from the finer gangue and oxides in a wet classifier.

After clasisfication, the metallic flake product from the classifier are further treated by low intensity magnetic separation or, if desired, a washing step, to remove additional gangue and iron oxide, thereby to produce a product substantially pure as to iron and iron oxide content. The heavy fraction from the classifier may be further enriched, if desired, by additional gravimetric concentration. Magnetic separation is most efficiently accomplished when the separator operates under conditions of low magnetic intensity to avoid as much as possible contamination of the concentrate with particles low in iron content. The lighter and finer fraction from the classifier may conveniently be further crushed, then passed over a magnetic separator of high magnetic intensity to produce a lower grade iron concentrate adapted for blast furnace feed material.

In order to illustrate the operation of the process of this invention, the following example is shown:

Example

An oxidic iron ore was treated at low temperature to provide a reduced ore containing a total Fe content in the form of metal and iron oxide of 36% with 75% of this in metallic state and the remainder in siliceous gangue and other impurities. The reduced ore was ground in a ball mill until examination of the product showed conversion of the metallic iron content into flake form. The ground product was pulped in water, the pulp fed to a Deister classifier adjusted to produce heavy flake iron, oxide and gangue fractions. The pulp containing the heavy flake iron fraction was then passed over a magnetic concentrator to produce a flake iron concentrate containing 92.8% total Fe and 84.8% metallic Fe. The flake iron produced amounted to about 10% of the iron content of the reduced ore. The concentrate after dewatering could readily be briquetted to form excellent open hearth feed material for the production of steel.

The fine or light fraction from the classifier containing a substantial percentage of fine metallic iron as well as unreduced oxide was further treated by crushing followed by high intensity magnetic separation to produce an iron concentrate suitable for blast furnace feed material.

The flake iron concentrate produced by the process of this invention will be substantially pure as regards iron content containing generally less than about 6% gangue and impurities. The iron content will be largely in the form of metallic iron together with a minor proportion of iron oxide. The total Fe analysis of this concentrate will be generally about 90%; and above 90% of the total iron will be in the form of metallic iron, equivalent to above about 80% of the concentrate.

While this invention has been described and illustrated by the example shown, it is not intended to be strictly limited thereto and other modifications and variations may be employed within the scope of the following claims.

I claim:

1. Process for produicng a metallic iron concentrate from partially reduced oxidic iron ore which comprises grinding said reduced ore in a mill of the ball mill type, and during said grinding forming the metallic iron contained in said partially reduced ore into flakes having substantial size, effecting a separation based upon specific gravity between a heavy fraction containing said flaked iron and a light fraction containing gangue and unflaked material whereby an iron concentrate substantially pure as to iron and iron oxide content and containing at least 80% metallic iron is obtained.

2. Process for producing a metallic iron concentrate from partially reduced oxidic iron ore which comprises grinding said reduced ore in a mill of the ball mill type, and during said grinding forming the metallic iron contained in said partially reduced ore into flakes having substantial size, treating the material from the grinding operation in a wet classifier to separate the flaked iron as a heavy fraction and passing said heavy fraction over a magnetic separator whereby an iron concentrate substantially pure as to iron and iron oxide and containing at least about 80% metallic iron is obtained.

3. Process for producing a metallic iron concentrate from partially reduced oxidic iron ore which comprises grinding said reduced ore in a mill of the ball mill type, and during said grinding forming the metallic iron contained in said partially reduced ore into flakes having substantial size, treating the material from the grinding operation in a wet classifier to separate the flaked iron as a heavy fraction and subjecting said heavy fraction to gravimetric concentration whereby an iron concentrate substantially pure as to iron and iron oxide content and containing at least 80% metallic iron is obtained.

4. Process for producing a metallic iron concentrate from partially reduced oxidic iron ore which comprises grinding said reduced ore in a mill of the ball mill type, and during said grinding forming the metallic iron contained in said partially reduced ore into flakes having substantial size, treating the material from the grinding operation in a wet classifier to separate the flaked iron as a heavy fraction and passing said heavy fraction over a magnetic separator of low magnetic intensity whereby an iron concentrate substantially pure as to iron and iron oxide and containing at least about 80% metallic iron is obtained.

5. Process according to claim 4 in which the light fraction from the wet classifier is crushed and passed over a magnetic separator of high magnetic intensity to provide a lower grade iron oxide concentrate.

References Cited in the file of this patent
UNITED STATES PATENTS

| | | |
|---|---|---|
| 644,180 | Lane | Feb. 27, 1900 |
| 1,785,283 | Podszus | Dec. 16, 1930 |
| 2,327,402 | Clark | Aug. 24, 1943 |
| 2,523,138 | Oppegard | Sept. 19, 1950 |
| 2,527,611 | Wulff | Oct. 31, 1950 |
| 2,603,423 | Buehl | July 15, 1942 |